US011837751B2

United States Patent
Adachi et al.

(10) Patent No.: US 11,837,751 B2
(45) Date of Patent: Dec. 5, 2023

(54) POLYOLEFIN MICRO-POROUS FILM AND POWER-STORAGE DEVICE

(71) Applicant: UBE CORPORATION, Ube (JP)

(72) Inventors: Taiga Adachi, Sakai (JP); Ryou Sakimoto, Sakai (JP)

(73) Assignee: UBE CORPORATION, Ube (JP)

( * ) Notice: Subject to any disclaimer, the term of this patent is extended or adjusted under 35 U.S.C. 154(b) by 139 days.

(21) Appl. No.: 17/418,152

(22) PCT Filed: Dec. 26, 2019

(86) PCT No.: PCT/JP2019/051134
§ 371 (c)(1),
(2) Date: Jun. 24, 2021

(87) PCT Pub. No.: WO2020/138293
PCT Pub. Date: Jul. 2, 2020

(65) Prior Publication Data
US 2022/0102811 A1   Mar. 31, 2022

(30) Foreign Application Priority Data
Dec. 27, 2018 (JP) ................................. 2018-245963

(51) Int. Cl.
| H01M 50/449 | (2021.01) |
| B32B 7/022 | (2019.01) |
| H01M 50/417 | (2021.01) |
| B32B 27/08 | (2006.01) |
| B32B 27/32 | (2006.01) |
| H01G 11/52 | (2013.01) |
| H01M 50/409 | (2021.01) |
| H01M 50/491 | (2021.01) |
| H01M 50/489 | (2021.01) |

(52) U.S. Cl.
CPC ........... *H01M 50/449* (2021.01); *B32B 7/022* (2019.01); *B32B 27/08* (2013.01); *B32B 27/32* (2013.01); *H01G 11/52* (2013.01); *H01M 50/409* (2021.01); *H01M 50/417* (2021.01); *H01M 50/489* (2021.01); *H01M 50/491* (2021.01); *B32B 2305/026* (2013.01); *B32B 2307/732* (2013.01); *B32B 2457/10* (2013.01); *B32B 2457/16* (2013.01)

(58) Field of Classification Search
CPC ............ B32B 27/32; B32B 7/00–7/14; H01M 50/449; H01M 50/417
See application file for complete search history.

(56) References Cited

U.S. PATENT DOCUMENTS

2019/0157647 A1   5/2019   Kidosaki et al.

FOREIGN PATENT DOCUMENTS

| CN | 102869490 A | 1/2013 |
| CN | 108473706 A | 8/2018 |
| JP | 10-261393 A | 9/1998 |
| JP | 2009-45775 A | 3/2009 |
| JP | 2016-14107 A | 1/2016 |
| JP | 2016-60061 A | 4/2016 |
| JP | 2017-141428 A | 8/2017 |
| JP | 2017-170763 A | 9/2017 |
| JP | 2017-536672 A | 12/2017 |

OTHER PUBLICATIONS

Teh et al. "Determination of the Zero Shear Viscosity of Polyethylene", ANTEC 2015, (2015); pp. 923-926.*
International Search Report dated Mar. 10, 2020 in PCT/JP2019/051134 filed on Dec. 26, 2019 (4 pages).
Combined Chinese Office Action dated Aug. 15, 2022 in Chinese Patent Application No. 201980085582.9 (with unedited computer generated English translation), 13 pages.
Japanese Notice of Allowance dated Apr. 4, 2023 in Japanese Patent Application No. 2018-245963 (with English translation), 4 pages.

* cited by examiner

*Primary Examiner* — Prashant J Khatri
(74) *Attorney, Agent, or Firm* — Oblon, McClelland, Maier & Neustadt, L.L.P.

(57) ABSTRACT

This polyolefin micro-porous film includes a multilayered structure, wherein the multilayered structure contains a first layer composed of polypropylene resin, a second layer composed of polyethylene resin and provided on the first layer, and a third layer composed of polypropylene resin and provided on the second layer. Furthermore, a thickness of the first layer is thinner than a thickness of the second layer, a thickness of the third layer is thinner than the thickness of the second layer, and in the multilayered structure, a thickness is 16 μm or less, a porosity is 40 to 70%, and a surface opening ratio is 10 to 30%.

7 Claims, No Drawings

POLYOLEFIN MICRO-POROUS FILM AND POWER-STORAGE DEVICE

This application is a national stage application of PCT/JP2019/051134, filed Dec. 26, 2019, entire contents of which is incorporated herein by reference, which claims priority to Japanese application 2018-245963, filed Dec. 27, 2018, the entire contents of which is incorporated herein by reference.

TECHNICAL FIELD

The present invention relates to a polyolefin micro-porous film and a power-storage device.

Priority is claimed on Japanese Patent Application No. 2018-245963, filed Dec. 27, 2018, the content of which is incorporated herein by reference.

BACKGROUND ART

In recent years, a power-storage device having a high energy density, high electromotive force, and a small amount of self-discharge has become widespread. For example, a lithium ion secondary battery and a lithium ion capacitor are known as such power-storage devices. In the lithium ion secondary battery and the lithium ion capacitor, a separator film is provided between a positive electrode and a negative electrode in order to prevent a short circuit between the positive electrode and the negative electrode when the positive electrode contacts the positive electrode. A polyolefin micro-porous film is used as the separator film.

With the separator film made of the polyolefin micro-porous film, when a temperature in the power-storage device becomes equal to or more than a predetermined temperature due to an abnormal current, pores of the microporous membrane are closed to prevent a mobility of ions between the electrodes, and thereby, an electrical resistance can be increased.

As a result, functions of the power-storage device are stopped, and accidents such as ignition caused by an excessive temperature rise can be prevented. A function of preventing accidents such as the ignition caused by the excessive temperature rise is vitally important for the separator film used for the power-storage device, and generally, the function is referred to as a closing pores or a shutdown (hereinafter, referred to as SD).

For example, a stacked porous film disclosed in Patent Document 1 is known as a polyolefin micro-porous film used for a separator for a battery. Patent Document 1 discloses a stacked porous film having a β activity, and having a first layer made of a composition including a mixture of a polypropylene-based resin and a resin of which a crystal melting peak temperature is lower than that of the polypropylene-based resin and the crystal melting peak temperature is equal or more 100° C., and a second layer made of a composition including a resin of which a crystal melting peak temperature is higher than that of the polypropylene-based resin.

CITATION LIST

Patent Literature

[Patent Document 1]
Japanese Unexamined Patent Application, First Publication No. 2009-045775

SUMMARY OF INVENTION

Technical Problem

In recent years, in power-storage devices, it has become required to enhance safety thereof and increase a capacity thereof. Accordingly, in the separator used for the power-storage device, it is required to thin the separator to realize large capacity, and enhance safety thereof.

This invention was made in view of the above circumstances and has an object of providing a polyolefin micro-porous film which is thinner and has excellent safety.

Furthermore, this invention has an object of providing a power-storage device, of which the polyolefin micro-porous film is provided between electrodes, having a large capacity and excellent safety.

Solution to Problem

In order to solve the above-mentioned problems, the inventors of the present invention conducted studies paying attention to a material and a thickness of the polyolefin micro-porous film.

As a result, the inventors of the present invention came up with a multilayered structure in which polypropylene resin layers are arranged on both surfaces of a polyethylene resin layer, a thickness of the polypropylene resin layers is thinner than a thickness of the polyethylene resin layer, a thickness of the multilayered structure is 16 μm or less, a porosity is 40 to 70%, and a surface opening ratio is 10 to 30%; and the present invention was developed based on this idea. That is, the present invention relates to the following aspects.

[1] A polyolefin micro-porous film includes a multilayered structure, wherein the multilayered structure includes a first layer composed of polypropylene resin, a second layer composed of polyethylene resin and provided on the first layer, and a third layer composed of polypropylene resin and provided on the second layer, wherein a thickness of the first layer is thinner than a thickness of the second layer, wherein a thickness of the third layer is thinner than the thickness of the second layer, and wherein in the multilayered structure, a thickness is 16 μm or less, a porosity is 40 to 70%, and a surface opening ratio is 10 to 30%.

[2] The polyolefin micro-porous film according to [1], wherein a zero shear viscosity $\eta PE(Pa \cdot s)$ of the polyethylene resin at 180° C. satisfies following Expression (I), $$\eta PE \leq \eta PP + 25{,}000 \qquad (I)$$

(wherein, in the Expression (I), $\eta PP$ indicates a zero shear viscosity (Pa·s) of the polypropylene resin at 180° C.).

[3] The polyolefin micro-porous film according to [1] or [2], wherein, when the thickness of the first layer and the thickness of the third layer are 1, the thickness of the second layer is 2 or more.

[4] The polyolefin micro-porous film according to any one of [1] to [3], wherein, in a short circuit test in which a voltage is applied to a test plate having a size of 10 cm×100 cm, a withstand voltage per unit area obtained by measuring a voltage in a non-conducting state is 3 kV/m² or more.

[5] A power-storage device comprising the polyolefin micro-porous film according to any one of [1] to [4], wherein the polyolefin micro-porous film is provided between electrodes.

Advantageous Effects of Invention

The polyolefin micro-porous film of the present invention includes the multilayered structure, wherein the multilayered structure includes the first layer composed of polypropylene resin, the second layer composed of polyethylene resin, and the third layer composed of polypropylene resin stacked in this order, and wherein in the multilayered structure, the thickness is 16 μm or less, the porosity is 40 to 70%, and the surface opening ratio is 10 to 30%. Thereby, it is possible to increase a capacity of the power-storage device using the polyolefin micro-porous film of the present invention as a separator.

Furthermore, in the polyolefin micro-porous film of the present invention, the thickness of the first layer is thinner than a thickness of the second layer and the thickness of the third layer is thinner than the thickness of the second layer. Thereby, the power-storage device using the polyolefin micro-porous film of the present invention can have excellent safety.

DESCRIPTION OF EMBODIMENTS

Hereinafter, an embodiment of the present invention will be described, but the present invention is not limited thereto and can be implemented with appropriate modifications within a range in which the effects of the present invention are achieved.

<Polyolefin Micro-Porous Film>

A polyolefin micro-porous film of an embodiment contains a multilayered structure (PP/PE/PP structure) consisting of a first layer composed of polypropylene (hereinafter, referred to as PP) resin, a second layer composed of polyethylene (hereinafter, referred to as PE) resin and provided on the first layer, and a third layer composed of polypropylene resin and provided on the second layer The thickness of the entire polyolefin micro-porous film is preferably thinned, so that compactification of a power-storage device can be achieved. The polyolefin micro-porous film in which the thickness of the entire polyolefin micro-porous film is thick is not preferable, because this causes a volume ratio of a separator made of the thicker polyolefin micro-porous film to increase and a capacity per unit volume of the power-storage device to decrease.

In the polyolefin micro-porous film of the embodiment, the thickness of the multilayered structure is 16 μm or less, is preferably 15 μm or less, and is more preferably 14 μm or less. When the thickness of the multilayered structure is 16 μm or less, the capacity per unit volume of the power-storage device using the polyolefin micro-porous film as the separator can be improved.

The thickness of the multilayered structure is preferably 7.0 μm or more, is more preferably 7.5 μm or more, is further preferably 8.0 μm or more, and is most preferably 8.5 μm or more. When the thickness of the multilayered structure is 7.0 μm or more, it is possible to obtain excellent mechanical strength when used as the separator provided between electrodes, and as a result, breakage of the multilayered structure is less likely to occur. That is, in the power-storage device, when the polyolefin micro-porous film is used as the separator, a short circuit is less likely to occur.

The thickness of the multilayered structure of the polyolefin micro-porous film can be obtained through image analysis in which an image obtained by observing a cross-section of the polyolefin micro-porous film is analyzed using a scanning electron microscope (SEM), or by using a dot type thickness-measuring apparatus.

In the polyolefin micro-porous film of the embodiment, the thickness of the first layer and the third layer composed of the PP resin is thinner than the thickness of the second layer composed of the PE resin (wherein the first layer<the second layer and the third layer<the second layer). The thickness of the first layer and the thickness of the third layer may be the same thickness, or different thicknesses. The thickness of the first layer and the thickness of the third layer are preferably the same thickness, so that curling (or warpage) of the polyolefin micro-porous film can be suppressed.

In the power-storage device using the polyolefin micro-porous film of the embodiment as the separator, when the internal temperature rises, the second layer is melted, because the second layer is composed of the PE resin of which the melting point is lower than that of the PP resin. Then, pores of the first layer and the third layer composed of the PP resin are closed by the melted PE resin. When the pores of the first layer and the third layer are closed, in the power-storage device, the mobility of ions between the positive electrode and the negative electrode is shut off, and thereby, the electrical resistance is increased and functions of the power-storage device are stopped (shut down).

In the polyolefin micro-porous film of the embodiment, since the thickness of the first layer and the third layer composed of the PP resin is thinner than the thickness of the second layer composed of the PE resin, the amount of the PE resin required to close the pores of the first layer and the third layer is easily ensured, shutdown faults are less likely to occur, and excellent safety is ensured.

When the thickness of the first layer and the thickness of the third layer are 1, the thickness of the second layer is preferably 1.2 or more, is more preferably 1.5 or more, and is further preferably 2 or more. When the ratio (proportion) of the thickness of the second layer composed of the PE resin in the thickness of the multilayered structure increases, the amount of the PE resin required to close the pores of the first layer and the third layer composed of the PP resin is easily ensured and shutdown faults are less likely to occur. When the thickness of the second layer is 2 or more with respect to 1 of the thicknesses of the first layer and the third layer, the amount of the PE resin can be ensured. As a result, the pores of the first layer and the third layer can be reliably closed and the occurrence of shutdown faults can be reliably prevented.

When the thickness of the first layer and the thickness of the third layer are 1, the thickness of the second layer is preferably 10 or less, is more preferably 9.5 or less, and is further preferably 9 or less. That is, when the thickness of the second layer is 10 or less with respect to 1 of the thicknesses of the first layer and the third layer, it is possible to completely prevent the second layer from influencing a shape of the first layer and the third layer composed of the PP resin when the PE resin of the second layer is melted. Accordingly, in the power-storage device in which the polyolefin micro-porous film is used as the separator, the occurrence of the short circuit due to contact with the electrode can be effectively prevented by melting the second layer and deforming the multilayered structure.

Based on the above, when the thickness of the first layer and the thickness of the third layer are the same, the thicknesses of the first layer and the third layer are shown as "a" and the thickness of the second layer is shown as "n×a", the ratio of the thickness of the first layer, the second layer, and the third layer can be shown as the first layer:the second layer:the third layer=a:na:a. At this time, a value of n may satisfy the following Expression (3).

$$1.2 \leq n \leq 10 \tag{3}$$

The value range of n is preferably 1.5≤n≤9.5, and is more preferably 2≤n≤9.

In the embodiment, the amount of the PP resin in the total amount of the multilayered structure is preferably 70 wt % or less, is more preferably 65 wt % or less, is further preferably 60 wt % or less, and is most preferably 55 wt % or less. The amount of the PP resin in the multilayered structure is preferably 70 wt % or less, so that the amount of the PE resin required to close the pores of the first layer and the third layer composed of the PP resin is easily ensured.

In the polyolefin micro-porous film of the embodiment, the porosity of the first layer, the porosity of the second layer, and the porosity of the third layer may be the same, may be different from each other, or the same porosity and different porosities may be combined.

The following description will show a relationship between the porosity of the multilayered structure composed of the first layer, the second layer, and the third layer, and the thickness ratio among the first layer, the second layer, and the third layer when the first layer, the second layer, and the third layer have the same porosity.

In the polyolefin micro-porous film of the embodiment, when the ratio of the thickness of the first layer, the second layer, and the third layer is the first layer:the second layer:the third layer=1:2:1 and the porosity of the multilayered structure is 50%, logically, the pores formed in the first layer and the third layer can be completely closed by the PE resin of the second layer.

Furthermore, when the ratio of the thickness of the first layer, the second layer, and the third layer is the first layer:the second layer:the third layer=1:3:1 and the porosity of the multilayered structure is 60%, or when the ratio of the thickness of the first layer, the second layer, and the third layer is the first layer:the second layer:the third layer=1:6:1 and the porosity of the multilayered structure is 75%, logically, the pores formed in the first layer and the third layer can be completely closed by the PE resin of the second layer.

Additionally, when the ratio of the thickness of the first layer, the second layer, and the third layer is the first layer:the second layer:the third layer=1:4:1 and the porosity of the multilayered structure is 67%, or when the ratio of the thickness of the first layer, the second layer, and the third layer is the first layer:the second layer:the third layer=1:5:1 and the porosity of the multilayered structure is 71%, logically, the pores formed in the first layer and the third layer can be sufficiently closed by the PE resin of the second layer.

When the ratio of the thickness of the first layer, the second layer, and the third layer is as described above and the porosity of the multilayered structure is less than the above value, an amount of the PE resin greater than the amount required for the shutdown can be ensured, and the amount of the PE used for the shutdown can have a margin.

Specifically, when the porosity of the multilayered structure, which is composed of the first layer, the second layer, and the third layer having the same porosity, is 50 to 70%, the value of n shown above in Expression (3) may satisfy the following Expression (4).

$$n \geq (\text{porosity} \times 2)/(100 - \text{porosity}) \tag{4}$$

When the porosity of the multilayered structure is 50 to 70% and the value of n shown above in Expression (3) satisfies the above Expression (4), it is possible to ensure the amount of the PE resin required for the shutdown to occur, to obtain an appropriate Gurley value, and to provide the polyolefin micro-porous film having a high short circuit prevention effect.

In the multilayered structure satisfying the above Expression (4), to provide a margin to the amount of the PE resin used for the shutdown to the porosity of the multilayered structure, the value of n shown in the above Expression (3) may satisfy the following Expression (5) (wherein, in Expression (5), m is more than 1.0 and less than or equal to 5).

$$n = \{(\text{porosity} \times 2)/(100 - \text{porosity})\} \times m \tag{5}$$

In the polyolefin micro-porous film of the embodiment, a surface opening ratio of the multilayered structure is 10 to 30%, and is preferably 12 to 25%. When the surface opening ratio of the multilayered structure is 10% or more, the polyolefin micro-porous film used as the separator of the power-storage device can have sufficient mobility of ions. Furthermore, when the surface opening ratio of the multilayered structure is 30% or less, the short circuit in the power-storage device in which the polyolefin micro-porous film is used as the separator can be effectively suppressed.

The porosity of the multilayered structure is 40 to 70%, and is preferably 50 to 60%. When the porosity of the multilayered structure is 70% or less, it is possible to ensure the mechanical strength of the polyolefin micro-porous film. Thereby, a short circuit can be suppressed, when the polyolefin micro-porous film is used as the separator of the power-storage device. Furthermore, when the porosity of the multilayered structure is 40% or more, the polyolefin micro-porous film used as the separator of the power-storage device can have sufficient mobility of ions and the power-storage device can have excellent performance.

In the multilayered structure of the polyolefin micro-porous film of the embodiment, the porosity of the multilayered structure is 40 to 70% and the surface opening ratio of the multilayered structure is 10 to 30%. Therefore, when the polyolefin micro-porous film of the embodiment is used as the separator of the power-storage device, an electrolyte is sufficiently maintained therein, the mechanical strength is sufficiently exhibited, and the occurrence of a short circuit via the separator can be effectively prevented.

In the embodiment, a lower limit value of a maximum pore diameter in the multilayered structure is preferably 0.05 μm or more, and is more preferably 0.08 μm or more. An upper limit value of the maximum pore diameter is preferably 2 μm or less, and is more preferably 0.5 μm or less. When the maximum pore diameter is 0.05 μm or more, the multilayered structure can have sufficient mobility of ions as the separator of the power-storage device. Furthermore, when the maximum pore diameter is 2 μm or less, the mobility of ions in the multilayered structure is prevented from being too great for the separator of the power-storage device.

The maximum pore diameter can be measured and calculated using a mercury porosimeter.

In the embodiment, a lower limit value of a permeability (the Gurley value) of the polyolefin micro-porous film is preferably 80 s/100 cc or more, is more preferably 90 s/100 cc or more, is further preferably 95 s/100 cc or more, and is most preferably 100 s/100 cc or more. An upper limit value of the permeability (the Gurley value) is preferably 500 s/100 cc or less, is more preferably 400 s/100 cc or less, is further preferably 300 s/100 cc or less, and is most preferably 250 s/100 cc or less.

When the polyolefin micro-porous film having the permeability of 500 s/100 cc or less is used as the separator of the power-storage device, the mobility of ions is unlikely to be suppressed or inhibited, and therefore this permeability is preferable. When the polyolefin micro-porous film having the permeability of 80 s/100 cc or more is used as the separator of the power-storage device, it is possible to inhibit a steep temperature raise that occurs when mobility of ions is too quick at the time of the fault of the power-storage device.

In the embodiment, a withstand voltage per unit area of the polyolefin micro-porous film is preferably 3 kV/m$^2$ or more, is more preferably 4 kV/m$^2$ or more, is further preferably 5 kV/m$^2$ or more, and is most preferably 6 kV/m$^2$ or more.

The withstand voltage per unit area of the polyolefin micro-porous film is obtained by measuring a voltage in a non-conducting state in a short circuit test in which a voltage is applied to a test plate having a size of 10 cm×100 cm. In other words, the polyolefin micro-porous film of the embodiment is preferably subjected to the short circuit test in which the voltage of 0.3 kV is applied to a test plate having a size of 10 cm×100 cm, in the non-conducting state.

The higher a test voltage to measure the voltage resistance of the polyolefin micro-porous film, the better. Since the test voltage depends on the thickness and the porosity, the test voltage is preferably 0.3 kV used as a test voltage of a battery, is more preferably 0.4 kV, is further preferably 0.5 kV, and is most preferably 0.6 kV.

The test area is preferably the entire surface area of the polyolefin micro-porous film. However, when a time required for the test, a number of persons, and cost are taken into consideration, the test area is preferably 0.10 m$^2$, is more preferably 0.15 m$^2$, and is most preferably 0.2 m$^2$.

In the polyolefin micro-porous film, both an interlaminar peel strength between the first layer and the second layer and an interlaminar peel strength between the third layer and the second layer are preferably 3 to 90 g/15 mm, and are more preferably 3 to 80 g/15 mm. When the interlaminar peel strength is 3 g/15 mm or more, it is possible to prevent the first layer from peeling from the second layer and/or to prevent the third layer from peeling from the second layer, occurrence of curling or stretching of the polyolefin micro-porous film can be suppressed, and thereby a high-quality power-storage device can be obtained.

A unit of "g/15 mm" means that the interlaminar peel strength is obtained by a polyolefin micro-porous film sample having a width of 15 mm in a transverse direction (TD direction).

The interlaminar peel strength between the first layer and the second layer can be obtained by the following measuring method.

Test pieces having a size of 15 mm in a width direction (transverse direction: TD)×200 mm in a length direction (machine direction: MD) are taken from the polyolefin micro-porous film at a central part of the polyolefin micro-porous film in TD and at both ends of polyolefin micro-porous film in TD (an end face of the test pieces in TD is a portion 10 mm inward from the end of the polyolefin micro-porous film in TD). At each position, one kind of the test piece in which a part of an adhesion surface between the first layer and the second layer is peeled from a surface A (one surface) of the test piece, and another kind of the test piece in which a part of an adhesion surface between the first layer and the second layer is peeled from a surface B (other surface) of the test piece are prepared. Furthermore, a total of six test pieces are prepared for each test piece.

Each test piece is set on a tensile testing machine RTC-1210A (manufactured by Orientec Corporation) in a state of T-form, and the interlaminar peel strength is measured in TD by using a load cell of 100 N with a distance of 50 mm between chucks and a cross-head speed of 50 mm/min After the start of peeling, the interlaminar peel strength is measured at 120 mm peeling, 140 mm peeling, 160 mm peeling, 180 mm peeling, and 200 mm peeling, and an average value of these measurement values is recognized as the interlaminar peel strength.

The interlaminar peel strength between the third layer and the second layer can be obtained in a similar manner to the measuring method of the interlaminar peel strength between the first layer and the second layer. When the first layer and the third layer have the same structure, only the interlaminar peel strength between the first layer and the second layer or the interlaminar peel strength between the third layer and the second layer may be measured.

When the polyolefin micro-porous film is used as the separator of the power-storage device, a polyolefin micro-porous film obtained by uniaxially stretching or a biaxially stretching is suitable for the polyolefin micro-porous film. Among them, the polyolefin micro-porous film uniaxially stretched in the length direction (in MD) is particularly preferable, since this polyolefin micro-porous film has a suitable strength and little thermal shrinkage in the width direction (in TD).

When the polyolefin micro-porous film obtained by uniaxially stretching is used as the separator, the thermal shrinkage in the length direction can be suppressed in winding this polyolefin micro-porous film together with the positive electrode and the negative electrode having a long sheet shape. Therefore, the polyolefin micro-porous film obtained by uniaxially stretching in the length direction is suitable for the separator constituting the winding electrode body.

In the embodiment, the PP resin constituting the first layer and the PP resin constituting the third layer may have the same property or may have different properties. Specifically, in the PP resin constituting the first layer and the PP resin constituting the third layer, the weight-average molecular weight, the molecular weight distribution, the pentad fraction, and the melting point may have the same values or one or more properties thereof may indicate have values. In order to suppress curling (or warpage) of the polyolefin micro-porous film, the PP resin constituting the first layer and the PP resin constituting the third layer preferably have the same property.

<Polyolefin Resin Constituting Polyolefin Micro-Porous Film>

The polyolefin micro-porous film of the embodiment includes the PP resin and the PE resin.

The present inventors found that the polyolefin microporous film having excellent productivity, excellent productivity, and excellent properties as the separator used for the power-storage device can be obtained by using the PP resin and the PE resin having the appropriate weight-average molecular weight and the appropriate molecular weight distribution in the polyolefin micro-porous film.

(Polypropylene Resin)

The PP resin is a polymer containing 80% or more propylene as a main monomer. In the embodiment, one kind of this polymer may be used singly, or some kinds of these polymers may be mixed. Furthermore, the PP resin generally contains additives such as a surfactant agent, a antioxidant, a plasticizer, a flame retardant, a colorant, and the like. The PP resin used in the embodiment may contain these additives.

The PP resin having the high tacticity is preferably used as the PP resin. The pentad fraction of the PP resin is preferably 80% or more, is more preferably 90% or more, and is further preferably 94% or more.

A lower limit value of the weight-average molecular weight of the PP resin is preferably 500,000 or more, is more preferably 540,000 or more, and is most preferably 550,000 or more. Furthermore, an upper limit value of the weight-average molecular weight of the PP resin is preferably 1,000,000 or less, is more preferably 950,000 or less, is further preferably 900,000 or less, is further preferably 800,000 or less, and is most preferably 750,000 or less.

The weight-average molecular weight of the PP resin is obtained by performing measurement using gel permeation chromatography (hereinafter, referred to as "GPC") and conversion using a standard polystyrene.

When the weight-average molecular weight of the PP resin is 500,000 or more, the mechanical characteristics and the meltdown temperature can improve, which is preferable. When the weight-average molecular weight of the PP resin is 1,200,000 or less, the processability of the polyolefin micro-porous film can improve, which is preferable.

A lower limit value of the molecular weight distribution of the PP resin is preferably 5 or more, is more preferably 5.5 or more, is further preferably 5.8 or more, and is most preferably 6.0 or more. An upper limit value of the molecular weight distribution of the PP resin is preferably 20 or less, is more preferably 19 or less, is further preferably 18 or less, and is most preferably 17 or less.

When the molecular weight distribution of the PP resin is 5 or more, the polyolefin micro-porous film can have a sufficiently high meltdown temperature. When the molecular weight distribution of the PP resin is 20 or less, the polyolefin micro-porous film can have excellent processability.

The molecular weight distribution of the PP resin is calculated by using the weight-average molecular weight and the number-average molecular weight obtained by GPC.

A lower limit value of the crystal melting peak temperature (the melting point) of the PP resin measured by using a differential scanning calorimeter (a DSC) is preferably 155° C. or more, is more preferably 157° C. or more, is further preferably 159° C. or more, and is most preferably 160° C. or more. An upper limit value thereof is preferably 175° C. or less, is more preferably 173° C. or less, is further preferably 170° C. or less, is most preferably 169° C. or less. When the melting point of the PP resin is 155° C. or more, it is possible to obtain the polyolefin micro-porous film having excellent processability.

The zero shear viscosity ηPP(Pa·s) of the PP resin at 180° C. is preferably 15,000 to 150,000 Pa·s. When the zero shear viscosity ηPP(Pa·s) of the PP resin is 15,000 Pa·s or more, it is possible to obtain the polyolefin micro-porous film with a meltdown temperature exceeding 180° C. When the zero shear viscosity ηPP(Pa·s) of the PP resin is 150,000 Pa·s or less, the property of holding the shape of the multilayered structure can improve. As a result, even under a high temperature environment exceeding 180° C., in the power-storage device using the polyolefin micro-porous film as the separator, the shape of the first layer, the shape of the third layer, and pore thereof can be retained. The zero shear viscosity ηPP(Pa·s) of the PP resin at 180° C. is more preferably 18,000 to 140,000 Pa·s, and is further preferably 20,000 to 130,000 Pa·s.

(Polyethylene Resin)

The PE resin is a polymer containing 80% or more ethylene as a main monomer. In the embodiment, one kind of this polymer may be used singly, or some kinds of these polymers may be mixed. Furthermore, the PE resin generally contains additives such as a surfactant agent, a antioxidant, a plasticizer, a flame retardant, a colorant, and the like. The PE resin used in the embodiment may contain these additives.

The density of the PE resin is preferably 0.950 g/cm$^3$ or more and 0.970 g/cm$^3$ or less. A high density polyethylene resin having a density of 0.960 g/cm$^3$ or more is preferably used as the PE resin, but a medium density polyethylene may be used.

The melting point of the PE resin is preferably 100° C. or more and 140° C. or less, and is more preferably 125° C. or more and 138° C. or less. In the polyolefin micro-porous film of the embodiment, the shutdown occurs at temperatures exceeding the melting point of the PE resin. That is, the melted PE resin flows into the pores of the first layer and the third layer composed of the PP resin, and the mobility of ions is shut off. When the melting point of the PE resin used in the polyolefin micro-porous film is 140° C. or less, the shutdown can start at an early stage, which is preferable. It is difficult to use a PE resin having a melting point of less than 100° C. as the material of the polyolefin micro-porous film.

The weight-average molecular weight of the PE resin is preferably 350,000 or more and 550,000 or less, and is more preferably 400,000 or more and 520,000 or less. The weight-average molecular weight of the PE resin is obtained by performing measurement using gel permeation chromatography (hereinafter, referred to as "GPC") and conversion using a standard polystyrene.

When the weight-average molecular weight of the PE resin is 350,000 or more, the shutdown fault occurring in the PE resin having too low of a melt viscosity is less likely to occur. When the weight-average molecular weight of the PE resin is 550,000 or less, the fluidity of the melted PE resin can be improved. As a result the melted PE resin easily flows into the pores of the first layer and the third layer composed of the PP resin, and the smooth start of the shutdown can be realized.

The molecular weight distribution of the PE resin is preferably 6 or more and 16 or less, and is more preferably 8 or more and 15 or less.

The molecular weight distribution of the PE resin is calculated by using the weight-average molecular weight and the number-average molecular weight obtained by GPC.

The zero shear viscosity ηPE(Pa·s) of the PE resin at 180° C. preferably satisfies the following Expression (I).

$$\eta PE \leq \eta PP + 25{,}000 \quad (I)$$

(in the Expression (1), OP indicates the zero shear viscosity (Pa·s) of the PP resin at 180° C.).

When the zero shear viscosity ηPE(Pa·s) of the PE resin at 180° C. satisfies the Expression (I), in the power-storage device using the polyolefin micro-porous film as the separator, the melted PE resin flows into the pores of the first layer and the third layer composed of the PP resin, and the smooth shutdown can be realized. Furthermore, the influence on the shape of the first layer and the third layer composed of the PP resin from the melted PE resin at 180° C. can be reduced. As a result, the breakage of the polyolefin micro-porous film does not occur at 180° C., and the impedance after the shutdown can be maintained in the polyolefin micro-porous film.

The zero shear viscosity ηPE(Pa·s) of the PE resin at 180° C. is preferably the zero shear viscosity of the PP resin at 180° C. ηPP+25,000 (Pa·s) or less, is more preferably ηPP+22,000 (Pa·s) or less. When the ηPE(Pa·s) is ηPP+25,000 (Pa·s) or less, it is possible to suppress the acceleration of the breakage of the PP layer generated by shrinking of the PE layer at the shutdown, which is preferable.

The zero shear viscosity of the PE resin at 180° C. is preferably 20,000 to 100,000 Pa·s. When the zero shear viscosity of the PE resin is 20,000 Pa·s or more, the second layer composed of the PE resin can have sufficient strength, which is preferable. When the zero shear viscosity of the PE resin is 100,000 Pa·s or less, the influence on the shape of the first layer and the third layer composed of the PP resin can be reduced, which is preferable. The zero shear viscosity of the PE resin at 180° C. is more preferably 22,000 to 95,000 Pa·s, and is further preferably 24,000 to 90,000 Pa·s.

<Method for Producing Polyolefin Micro-Porous Film>

Hereinafter, the method for producing the polyolefin micro-porous film of the embodiment will be described.

The polyolefin micro-porous film of the embodiment is preferably produced by a dry process without using a solvent in the producing process.

The polyolefin micro-porous film produced by the dry process has a higher meltdown temperature than a polyolefin micro-porous film produced by a wet process. It is assumed that the cause is the solvent remaining in the microporous membrane produced by the wet process and acting as a plasticizer.

The polyolefin micro-porous film of the embodiment is produced through three processes of a raw film (a precursor film) producing process, a laminating process, and a stretching process.

(Raw Film Producing Process)

In the embodiment, a PP film formed of the PP resin and a PE film formed of the PE resin are prepared as the raw films (the precursor films). In the embodiment, the thickness of the PP film prepared as the raw film is preferably thinner than the thickness of the PE film prepared as the raw film. The ratio between the thickness of the PP film and the thickness of the PE film prepared as the raw films is preferably determined in accordance with the ratio of the thickness of the first layer, the second layer, and the third layer contained in the polyolefin micro-porous film.

The raw film may have properties to make a porous body by stretching the raw film.

Furthermore, the raw film may have a constant thickness. Specifically, the coefficient of variation (C.V.) to the thickness of the raw film is preferably 0.001 or more and 0.030 or less.

When the coefficient of variation to the thickness of the raw film is within the above range, the surface roughness of the polyolefin micro-porous film produced by using this raw film is sufficiently small.

The method for forming the raw film is preferably the melt molding method using the T-die. When the PP film and the PE film used as the raw films in the polyolefin micro-porous film are formed by the melt molding method using the T-die, the PP film and the PE film may be separately formed.

The melt moldings of the PP film and the PE film are preferably performed under conditions of a melting temperature of 20° C. or more and 60° C. or less of the each of resins used as the raw material of films at a draft ratio of 10 or more and 1,000 or less, preferably a draft ratio of 50 or more and 500 or less.

When the PP film and the PE film are formed by the melt molding method using the T-die, the take-up speed is not limited. However, the take-up speed may generally be 10 m/min or more and 200 m/min or less. The take-up speed is important because the take-up speed has an effect on the properties (the birefringence, the elasticity recovery rate, the pore diameter and the porosity in the polyolefin micro-porous film, the interlaminar peel strength, the mechanical strength, and the like) of the final polyolefin micro-porous film.

The method for forming the raw film used in the method for producing the polyolefin micro-porous film of the embodiment is not limited to the melt molding method using the T-die, and for example, an inflation molding method, a wet solution method, and the like can be used.

(Laminating Process)

In the laminating process, a multilayered film in which the raw films of the PP film, the PE film, and the PP film are laminated in that order is subjected to thermal compression. In the embodiment, for example, each film subjected to the thermal compression is separately wound off of each raw film roll stand, the PP films are arranged on both surfaces of the PE film, and these films are passed between heated rolls. Thereby, the each PP film is bonded on both surfaces of the PE film by thermal compression.

In the thermal compression, the temperature of the rolls (the thermal compression temperature) is preferably 120° C. or more and 160° C. or less, and is more preferably 125° C. or more and 150° C. or less. When the thermal compression temperature is 120° C. or more, the peel strength between the PP film and the PE film in the multilayered film is sufficiently high, and the separation between the PP film and the PE film can be suppressed in the stretching process. When the thermal compression temperature is 160° C. or less, it is possible to prevent the degradation of the birefringence and the elastic recovery ratio caused by melting of the PE film in the thermal compression.

In the producing method of the embodiment, for example, a multilayer raw film of the PP film, the PE film, and the PP film stacked in that order may be formed by using the multilayer raw film forming apparatus. When the multilayered film is obtained by using the multilayer raw film forming apparatus, the laminating process is not required.

(Stretching Process)

In the stretching process, the multilayered film is made into the porous body by stretching the multilayered film, and the polyolefin micro-porous film of the embodiment having the thickness of 16 µm or less in the multilayered structure is produced.

In the embodiment, an initial stretching ratio, a maximum stretching ratio, and a final stretching ratio that will be described later are suitably determined based on target values of the thickness of the multilayered film stretched in the stretching process and the thickness of the polyolefin micro-porous film in the multilayered structure In the stretching process of the embodiment, a heat treatment process, a low temperature stretching process, a high temperature stretching process, a thermal relaxation process, and a heat fixing process are performed in this manner.

(Heat Treatment Process)

In the stretching process, the multilayered film is subjected to the heat treatment process to heat the multilayered film in a heat treatment zone (in an oven 1).

The heating treatment of the multilayered film may be performed in a heating air convection oven or heated rolls under stretching of 0% (original length) or stretching of 10% or less.

The heat temperature is preferably 110° C. or more and 150° C. or less, and is more preferably 115° C. or more and 140° C. or less. When the heat temperature is 110° C. or more, a sufficiently porous polyolefin micro-porous film can be easily obtained. When the heat temperature is 150° C. or less, it is possible to prevent the PE resin contained in the multilayered film from melting, which is preferable.

The time for heating is preferably 3 seconds or more and 3 minutes or less.

(Low Temperature Stretching Process)

Next, the heated multilayered film is subjected to the low temperature stretching process to stretch the heated multilayered film at a low temperature in a cold stretch zone.

The temperature of the low temperature stretch is preferably −20° C. or more and 50° C. or less, and is more preferably 20° C. or more and 40° C. or less. When the temperature of the low temperature stretch is −20° C. or more, breakage of the multilayered film in the low temperature stretch is less likely to occur, which is preferable. When the temperature of the low temperature stretch is 50° C. or less, a sufficiently porous polyolefin micro-porous film can be easily obtained, which is preferable.

The stretch ratio of the multilayered film in the low temperature stretching process (the initial stretching ratio) is preferably 3% or more and 200% or less, and is more preferably 5% or more and 100% or less. In other words, when the length of the multilayered film before the stretching process is 1, the length of the multilayered film in the stretching direction is preferably 1.03 or more and 3.00 or less after the low temperature stretching process, and is more preferably 1.05 or more and 2.00 or less.

When the stretch ratio in the low temperature stretching process is 3% or more, a sufficiently porous polyolefin micro-porous film can be easily obtained. When the stretch ratio in the low temperature stretching process is 200% or less, it is possible to prevent the porosity and the pore diameter from increasing, and thereby the polyolefin micro-porous film having the desirable porosity and the desirable pore diameter can be obtained.

(High Temperature Stretching Process)

Next, the low-temperature-stretched multilayered film is subjected to the high temperature stretching process to stretch the low-temperature-stretched multilayered film at a high temperature in a high temperature stretch zone (oven 2).

In the embodiment, the low temperature stretching process and the high temperature stretching process are performed after the heat treatment process. Since both the low temperature stretching process and the high temperature stretching process are performed, both the PP film and the PE film may be sufficiently porous. As a result, the suitable polyolefin micro-porous film used as the separator of the power-storage device can be obtained.

When only one of the low temperature stretching process or the high temperature stretching process is performed, the PP film or the PE film may not be sufficiently porous.

The temperature of the high temperature stretch is preferably 70° C. or more and 150° C. or less, and is more preferably 80° C. or more and 145° C. or less. When the temperature of the high temperature stretch is within the above range, a sufficiently porous polyolefin micro-porous film can be easily obtained, which is preferable.

The stretch ratio of the multilayered film in the high temperature stretching process (the maximum stretching ratio) is preferably 100% or more and 400% or less. In other words, when the length of the multilayered film before the stretching process is 1, the length of the multilayered film in the stretching direction is preferably 2.00 or more and 5.00 or less after the high temperature stretching process. When the stretch ratio of the multilayered film in the high temperature stretching process is 100% or more, the polyolefin micro-porous film has sufficient porosity and a sufficient surface opening ratio thereof. When the stretch ratio of the multilayered film in the high temperature stretching process is 400% or less, it is possible to prevent the porosity and the surface opening ratio thereof from increasing, and thereby the polyolefin micro-porous film having the desirable permeability can be obtained.

(Thermal Relaxation Process)

Next, the high temperature stretched multilayered film is subjected to the thermal relaxation process to heat shrink the high temperature stretched multilayered film in the high temperature stretch zone (the oven 2). The thermal relaxation process is performed to prevent the multilayered film from heat shrinking in the stretching direction of the multilayered film due to residual stress of the low temperature stretching process and the high temperature stretching process.

In the thermal relaxation process, the reduction ratio (the final stretching ratio) of the length of the multilayered film subjected to the high temperature stretching process in the stretching direction is preferably 10% or more and 300% or less. In other words, when the length of the multilayered film before the stretching process is 1, the length of the multilayered film in the stretching direction is preferably 1.10 or more and 4.00 or less after the thermal relaxation process.

The temperature of the thermal relaxation process (the heat shrinking temperature) is preferably 70° C. or more and 145° C. or less, and is more preferably 80° C. or more and 140° C. or less. When the temperature of the thermal relaxation process is 140° C. or less, it is possible to prevent the PE resin contained in the multilayered film from melting, which is preferable. When the temperature of the thermal relaxation process is 70° C. or more, the thermal relaxation of the multilayered film is sufficiently performed and shrinking of the polyolefin micro-porous film in the stretching direction can be effectively suppressed.

(Heat Fixing Process)

Finally, the heat-shrunk multilayered film is subjected to the heat fixing process to fix the length of the polyolefin micro-porous film in the stretching direction by heating in a heat fixation zone (an oven 3), so that the length of the polyolefin micro-porous film in the stretching direction is not changed.

The heating treatment of the heat shrunk multilayered film may be performed in the heating air convection oven or the heated rolls under 0% of stretching (previous length) or 10% or less of stretching.

The heat temperature (the temperature of fixation) of the heat-shrunk multilayered film is preferably 110° C. or more and 150° C. or less, and is more preferably 115° C. or more and 140° C. or less. When the heat temperature is 110° C. or more, the effects of the feat fixation can be sufficiently obtained, and thereby the heat shrinking rate of the polyolefin micro-porous film can be effectively suppressed. When the heat temperature is 150° C. or less, it is possible to prevent the PE resin contained in the multilayered film from melting, which is preferable.

Through the above method, the polyolefin micro-porous film of the embodiment includes the multilayered structure, of which the first layer composed of the PP resin, the second layer composed of the PE resin, and the third layer composed of the PP resin are stacked in that order, the thickness of the multilayered structure is 16 μm or less, and each of the thickness of the first layer and the third layer is thinner than the thickness of the second layer, can be obtained.

In the polyolefin micro-porous film of the embodiment, the thickness of the multilayered structure is thin enough, and the thickness is 16 μm or less. Accordingly, when the polyolefin micro-porous film is used as the separator of the power-storage device, the volume ratio of the separator in the power-storage device is reduced and a capacity per unit volume of the power-storage device can increase.

Furthermore, in the polyolefin micro-porous film of the embodiment, the thickness of the first layer and the third layer composed of the PP resin is thinner than the thickness of the second layer composed of the PE resin. Accordingly, the amount of the PE resin required to perform the shutdown can be ensured, even if the multilayered structure is a thin film having the thickness of 16 μm or less. Therefore, the power-storage device using the polyolefin micro-porous film of the embodiment as the separator has the high shutdown property at the predetermined internal temperature or higher and has excellent safety.

That is, in this power-storage device, when the internal temperature increases to the predetermined temperature or more, the PE resin forming the second layer is melted before the first layer and the third layer composed of the PP resin are melted. The melted PE resin flows into the pores of the first layer and the third layer. In the embodiment, the thickness of the first layer and the third layer is thinner than the thickness of the second layer, and thereby the pores of the first layer and the third layer can be sufficiently closed by the melted PE resin. As a result, the mobility of ions between the electrodes of the power-storage device can be shut off (shut down), while the shapes of the first layer and the third layer are maintained. Furthermore, after shutting down, the contact of the positive electrode with the negative electrode in the power-storage device can be prevented by the polyolefin micro-porous film in which all or a part of the second layer is melted and the shapes of the first layer and the third layer are maintained.

<Separator Film Used for Power-Storage Device>

The separator film used for the power-storage device of the embodiment includes the polyolefin micro-porous film of the embodiment.

The separator film used for the power-storage device of the embodiment may be composed of only the polyolefin micro-porous film of the embodiment. That is, the polyolefin micro-porous film of the embodiment may be used as the separator film of the power-storage device, without processing.

The separator film of the power-storage device of the embodiment may be the separator film including the polyolefin micro-porous film of the embodiment. Therefore, the separator film of the power-storage device of the embodiment may include at least one layer selected from a heat-resistant porous layer, an adhesive layer, and a functional layer provided on one or both surfaces of the polyolefin micro-porous film. One or more than one of each of the heat-resistant porous layer, the adhesive layer, and the functional layer may be used. The heat-resistant porous layer, the adhesive layer, and the functional layer may be provided separately as layers having individual functions. At least two layers selected from a heat-resistant porous layer, an adhesive layer, and a functional layer may be provided as the layer having two or more functions.

As the heat-resistant porous layer, the adhesive layer, and the functional layer, known layers may be provided.

Examples of the heat-resistant porous layer include a layer composed of heat-resistant fine particles and an organic binder.

Examples of the adhesive layer include a layer composed of an organic material such as a fluororesin.

Examples of the functional layer include a layer composed of organic fine particles and a binder.

The heat-resistant porous layer, the adhesive layer, and the functional layer may be formed by a coating method coating with a predetermined coating liquid.

When the separator film, which has the heat-resistant porous layer, the adhesive layer, and the functional layer provided in that order on one or both surfaces of the polyolefin micro-porous film, is produced for the power-storage device, the separator film can be produced by the following method.

The heat-resistant porous layer is formed by coating one or both surfaces of the polyolefin micro-porous film with a coating liquid containing the heat-resistant fine particles and an organic binder. Next, the adhesive layer is formed by coating the heat-resistant porous layer with a coating liquid containing the organic material such as the fluororesin. Finally, the functional layer is formed by coating the adhesive layer with a coating liquid containing the organic fine particles and the binder. As a result, the separator film, which has the heat-resistant porous layer, the adhesive layer, and the functional layer provided in that order on one or both surfaces of the polyolefin micro-porous film, can be obtained for the power-storage device.

(Heat-Resistant Porous Layer)

The heat-resistant porous layer provided on the separator film used for the power-storage device of the embodiment will be described in detail.

The heat-resistant porous layer is a layer including the heat-resistant fine particles, and may include the organic binder. When the heat-resistant porous layer includes the heat-resistant fine particles, the heat resistance of the separator film used for the power-storage device is improved. The heat-resistant porous layer may be used as a single layer or multiple layers containing a number of the heat-resistant porous layers may be used.

(Heat-Resistant Fine Particles)

The heat resistance temperature of the heat-resistant fine particles is preferably 200° C. or more, is more preferably 300° C. or more, and is further preferably 400° C. or more.

The heat resistance temperature is the temperature at which no deformation or other changes in shape can be visually observed.

The heat-resistant fine particles may be inorganic fine particles having electrical insulation properties. As the heat-resistant fine particles, for example, inorganic oxide fine particles such as iron oxide, silica ($SiO_2$), alumina ($Al_2O_3$), $TiO_2$, magnesia, boehmite, and $BaTiO_2$; inorganic nitride fine particles such as aluminum nitride and silicon nitride; insoluble ionic crystal fine particles such as calcium fluoride, barium fluoride, and barium sulfate; covalently crystal fine particles such as silicon and diamond; and clay fine particles such as montmorillonite may be provided.

The inorganic oxide fine particles may be fine particles made of a material from a mineral resource such as bermite, zeolite, apatite, kaolin, mullite, spinel, olivine, and mica, or synthetic fine particles thereof. The inorganic compounds constituting the inorganic oxide fine particles may be subjected to element substitution or may be in a state of a solid solution, if necessary. Furthermore, the inorganic oxide fine particles may be subjected to surface treatment.

The heat-resistant fine particles may also be particles that are given electrical insulation properties by coating a surface of an electrically conductive material such as a conductive oxide or one or more selected from a metal, $SnO_2$, and tin-indium oxide (ITO), and a carbonaceous material such as one or more selected from carbon black and graphite with a material (for example, the above inorganic oxides) having the electrical insulation properties.

The organic fine particles may be used as the heat-resistant fine particles. As the organic fine particles, cross-linked polymer fine particulates such as polyimide, melamine resin, phenol resin, aromatic polyamide resin, cross-linked polymethylmethacrylate (cross-linked PMMA), cross-linked polystyrene (cross-linked PS), polydivinylbenzene (PDVB), and benzoguanamine-formaldehyde condensate; and heat-resistant polymer fine particles such as thermoplastic polyimide may be provided. The organic resins (polymers) forming these organic particles may be mixtures, modified bodies, derivatives, copolymers (random copolymers, alternating copolymers, block copolymers, or graft copolymers), or cross-linked bodies (in the case of the heat-resistant polymers described above) of the materials described above.

The above heat-resistant fine particles may be used alone or in combination with one or more of the above heat-resistant fine particles. As described above, inorganic fine particles and organic fine particles can be used as the heat-resistant fine particles, and they may be selected and used appropriately in accordance with the use.

Boehmite may be used for the heat-resistant fine particles. Boehmite in which the average grain diameter is preferably 0.001 μm or more, is more preferably 0.1 μm or more, is preferably 15 μm or less, and is more preferably 3 μm or less may be used as the above boehmite.

The average grain diameter of the heat-resistant fine particles is obtained as the number average particle diameter by using a laser diffraction particle size analyzer ("LA-920" manufactured by HORIBA, Ltd.) and measuring a dispersion liquid dispersed the heat-resistant fine particles in a liquid not dissolving the heat-resistant fine particles.

The shape of the heat-resistant fine particles may be, for example, close to a spherical shape or a plate shape. In terms of the short circuit prevention effect, the shape of the heat-resistant fine particles is preferably the plate shape. Examples of the heat-resistant fine particles having the plate shape are alumina and bermite.

(Organic Binder)

The organic binder is added to the heat-resistant porous layer to bind between the heat-resistant fine particles contained as the main component in the heat-resistant porous layer, and to bind the heat-resistant fine particles and the polyolefin micro-porous film.

The organic binder is not limited, as long as the organic binder binds excellently between the heat-resistant fine particles and binds the heat-resistant fine particles and the polyolefin micro-porous film, and the organic binder has electrochemical stability and stability to the electrolyte of the power-storage device.

As the organic binder, for example, ethylene-vinyl acetate copolymers (EVA, a unit structure of vinyl acetate is 20 to 35 mol %), ethylene-acrylic acid copolymers such as ethylene-ethyl acrylate copolymers (EEA), fluorine resins (such as polyvinylidene fluoride (PVDF)), fluorinated rubbers, styrene-butadiene rubber (SBR), water-soluble cellulose derivatives such as carboxymethyl cellulose (CMC) and hydroxyethyl cellulose (HEC), polyvinyl alcohol (PVA), polyvinyl butyral (PVB), polyvinylpyrrolidone (PVP), poly-N-vinyl acetamide, cross-linked acrylic resin, polyurethane, epoxy resin, and polyimide may be used. One of these organic binders may be used alone, or two or more may be used together.

Among these organic binders, the organic binder may be one having a heat resistance temperature of 150° C. or more. Specifically, ethylene-vinyl acetate copolymers (EVA), ethylene-acrylic acid copolymers, ethylene-ethyl acrylate copolymers (EEA), polyvinyl butyral (PVB), fluorinated rubbers, and styrene-butadiene rubber (SBR) have excellent flexibility, which is preferable. Furthermore, as the organic binder, it is also preferable to use a cross-linked acrylic resin with a low glass transition temperature (self-cross-linking acrylic resin), which has butyl acrylate as a main component of the organic binder and has a cross-linked structure of cross-linked butyl acrylate.

The heat-resistant porous layer includes the heat-resistant fine particles as a main component thereof. Being the main component means that 70% or more by weight of the heat-resistant fine particles is constrained in the total weight of the components of the heat-resistant porous layer.

In the total weight of the components of the heat-resistant porous layer, the amount of the heat-resistant fine particles is preferably 80 wt % or more, and is more preferably 85 wt % or more. When the heat-resistant porous layer includes the heat-resistant fine particles as the main component thereof, the spacing between the heat-resistant fine particles becomes appropriate, and the thermal shrinkage of the separator film for the power-storage device having the polyolefin micro-porous film can be suppressed well. A suitable upper limit of the amount of the heat-resistant fine particles in the heat-resistant porous layer is, for example, 99 wt % or less of the total weight of the components of the heat-resistant porous layer.

The amount of the organic binder in the heat-resistant porous layer is preferably 1.1 to 30 parts by weight with respect to 100 parts by weight of the heat-resistant fine particles. When the amount of the organic binder is 30 parts or less by weight, it is possible to prevent the function of the separator from being interfered with by closing pores of the heat-resistant porous layer by the organic binder, which is preferable. When the amount of the organic binder is 1.1 parts or more by weight, the effect of including the organic binder becomes more pronounced.

The thickness of the heat-resistant porous layer is preferably 0.5 μm or more, is more preferably 1 μm or more, and is further preferably 2 μm or more. The thickness of the heat-resistant porous layer is preferably 10 μm or less, is more preferably 8 μm or less, and is further preferably 6 μm or less. When the thickness of the heat-resistant porous layer is 0.5 μm or more, a meltdown suppressing effect obtained by providing the heat-resistant porous layer can be sufficiently obtained. When the thickness of the heat-resistant porous layer is 10 μm or less, defects of the heat-resistant porous layer are less likely to occur, which is preferable. Furthermore, when thickness of the heat-resistant porous layer is 10 μm or less, it is possible to prevent the heat-resistant porous layer from increasing the battery producing costs and reducing the energy density per volume and per weight in the power-storage device using the separator film for the power-storage device by increasing the amount of the injected electrolyte in an excessively thick heat-resistant porous layer, which is preferable.

(Method for Forming Heat-Resistant Porous Layer)

The method for forming the heat-resistant porous layer includes a coating liquid preparation process of preparing a coating liquid containing the heat-resistant fine particles, a coating process of coating one or both surfaces of the polyolefin micro-porous film with the coating liquid, and a drying process of drying the coating liquid provided on the surface of the polyolefin micro-porous film to form the heat-resistant porous layer.

(Coating Liquid Preparation Process)

The coating liquid used to form the heat-resistant porous layer includes the heat-resistant fine particles, the organic binder optionally contained therein, and a medium. The organic binder contained in the coating liquid may be dissolved in the medium, or may be dispersed in the medium to form an emulsion state.

A medium that gives no damage to the polyolefin micro-porous film such that the polyolefin micro-porous film is dissolved or swells is used as the medium.

As the medium of the coating liquid, an organic solvent may be used. The organic solvent may have a low boiling point. When the boiling point of the organic solvent is low, the organic solvent can be easily eliminated at a low temperature, and thereby the organic solvent gives no damage such as thermofusion to the polyolefin micro-porous film.

The organic solvent used as the medium may uniformly dissolve the organic binder when the coating liquid includes the organic binder. As the organic solvent, for example, furans such as tetrahydrofuran (THF); ketones such as methyl ethyl ketone (MEK) and methyl isobutyl ketone (MIBK); and the like are suitable.

When the organic solvent is used as the medium, alcohols (polyhydric alcohols such as ethylene glycol and triethylene glycol) and/or surfactant agents (linear alkylbenzene sulfonates, polyoxyethylene alkyl ethers, and polyoxyethyl alkyl phenyl ethers) are optionally added to the coating liquid, in addition to the heat-resistant fine particles and the organic solvent.

Furthermore, water may be used as the medium of the coating liquid. In that case, alcohols (such as ethanol, isopropanol, or the like having a carbon number of 6 or less) and/or surfactant agents (for example, those described above as the surfactant agents used in the coating liquid including the above organic solvent as the medium) are optionally added to the coating liquid, in addition to the heat-resistant fine particles and the water.

The coating liquid used to form the heat-resistant porous layer can be obtained by mixing the heat-resistant fine particles, the medium, the optional organic binder, the optional alcohols, and the optional surfactant agents using known methods.

(Coating Process)

The conventional casting methods or coating methods are used in the coating process for coating one or both surface of the polyolefin micro-porous film with the coating liquid. Specifically, for example, in this process, well-known coating devices such as a roll coater, an air knife coater, a blade coater, a rod coater, a bar coater, a comma coater, a gravure coater, a silk screen coater, a die coater, or a micro-gravure coater are used.

(Drying Process)

Finally, the coating liquid provided on one or both surfaces of the polyolefin micro-porous film is dried to eliminate the medium from the coating liquid. Through the above processes, the heat-resistant porous layer is formed on one or both surfaces of the polyolefin micro-porous film.

When the average thickness of the polyolefin micro-porous film is a (μm) and the average thickness of the heat-resistant porous layer is b (μm), a value of a thickness ratio a/b is preferably 0.5 or more and 20 or less, and is more preferably 1 or more and 10 or less. When the value of the thickness ratio a/b is 20 or less, it is possible to prevent the amount of the injected electrolyte from increasing and to prevent the energy density from decreasing in the polyolefin micro-porous film having the heat-resistant porous layer, since the thickness of the heat-resistant porous layer is not too thick with respect to the thickness of the polyolefin micro-porous film. When the thickness ratio a/b is 0.5 or more, the meltdown suppressing effect obtained by providing the heat-resistant porous layer can be sufficiently obtained.

In the polyolefin micro-porous film provided with the heat-resistant porous layer on one or both surfaces of the polyolefin micro-porous film, the Gurley value (the permeability) is not limited, however, the Gurley value (the permeability) is preferably 80 to 700 s/100 cc, is more preferably 90 to 650 s/100 cc, and is further preferably 100 to 600 s/100 cc. When the Gurley value is 700 s/100 cc or less, the function of the polyolefin micro-porous film having the heat-resistant porous layer as the separator of the power-storage device can be sufficiently obtained. When the Gurley value is 80 s/100 cc or more, in the polyolefin micro-porous film having the heat-resistant porous layer and used as the separator of the power-storage device, it is easy to ensure uniformity of an internal reaction.

<Power-Storage Device>

The power-storage device of the embodiment has at least the positive electrode, the negative electrode, the separator provided between the positive electrode and the negative electrode, and a nonaqueous electrolyte impregnated with the separator.

The power-storage device of the embodiment has the polyolefin micro-porous film of the embodiment or the separator film used for the power-storage device as the separator.

The polyolefin micro-porous film of the embodiment or the separator film used for the power-storage device can be used as the separator in a first power-storage device and a second power-storage device. Among them, the polyolefin micro-porous film or the separator film is preferably used as the separator for a lithium-ion battery (the first power-storage device) or a lithium ion capacitor (the second power-storage device) including a lithium salt as the electrolyte salt, is more preferably used as the separator for a lithium-ion battery, and is further preferably used as the separator for a lithium-ion secondary battery.

The shape of the separator used in the power-storage device may be determined as an appropriate shape according to the shape of the lithium-ion secondary battery. The shapes of the positive electrode and the negative electrode may be determined as appropriate shapes according to the shape of the lithium-ion secondary battery.

(Lithium-Ion Secondary Battery)

The lithium-ion secondary battery of the embodiment has the positive electrode, the negative electrode, the separator, and the nonaqueous electrolyte.

(Nonaqueous Electrolyte)

The nonaqueous electrolyte used in the power-storage device of the embodiment includes, for example, the electrolyte salt and the nonaqueous solvent.

The nonaqueous solvent may be in a liquid state or a gel state.

(Nonaqueous Solvent)

The nonaqueous solvent used in the nonaqueous electrolyte is preferably a cyclic carbonate and/or a chain ester. Since the electrochemical properties at a width temperature range, especially at high temperatures, synergistically improve, the nonaqueous solvent preferably includes the chain ester, more preferably includes the cyclic carbonate, and most preferably includes both the chain ester and the cyclic carbonate. The concept of a cyclic carbonate as used herein includes chain carbonates and chain carboxylic acid esters.

The cyclic carbonate is one or more selected from ethylene carbonate (EC), propylene carbonate (PC), and vinylene carbonate (VC), and is preferably a combination of the EC and the VC or a combination of the PC and the VC.

When the nonaqueous solvent includes ethylene carbonate and/or propylene carbonate, the stability of the film formed on the electrode increases and a cycle characteristic at a high temperature and under a high voltage improves, which is preferable. The amount of ethylene carbonate and/or propylene carbonate is preferably 3% or more by volume, more preferably 5% or more by volume, and further preferably 7% or more by volume, with respect to the total volume of the nonaqueous solvent. Furthermore, the upper limit thereof is preferably 45% or less by volume, more preferably 35% or less by volume, and further preferably 25% or less by volume.

As the chain ester, methyl ethyl carbonate (MEC) is suitably used as an asymmetric chain carbonate; dimethyl carbonate (DMC) and diethyl carbonate (DEC) are suitably used as symmetric chain carbonates; and ethyl acetate (EA) is suitably used as a chain carboxylic acid ester. As the chain ester, a combination of the MEC and the EA having an asymmetric structure and an ethoxy group can be used.

The amount of the chain ester is not limited, but is preferably 60 to 90% by volume with respect to the total volume of the nonaqueous solvent. When the amount of the chain ester is 60% or more by volume, the viscosity of the nonaqueous electrolyte is not too high, which is preferable. When the amount of the chain ester is 90% or less by volume, the electrical conductivity does not easily decrease and the electrochemical properties at a width temperature range, especially at high temperatures, are synergistically unlikely to degrade, which is preferable.

In the chain ester, the mount of the EA is preferably 1% or more by volume, and is more preferably 2% or more by volume in the nonaqueous solvent. The upper limit of the mount of the EA is preferably 10% or less by volume, and is more preferably 7% or less by volume. The symmetric chain carbonate preferably includes an ethyl group, and methyl ethyl carbonate is especially desirable.

The ratio of the cyclic carbonate and the chain ester by volume (cyclic carbonate:chain ester) is preferably 10:90 to 45:55, is more preferably 15:85 to 40:60, and is further preferably 20:80 to 35:65.

(Electrolyte Salt)

The electrolyte salt used in the power-storage device of the embodiment is preferably a lithium salt.

The lithium salt is preferably one or more selected from $LiPF_6$, $LiBF_4$, $LiN(SO_2F)_2$, and $LiN(SO_2CF_3)_2$, is more preferably one or more selected from $LiPF_6$, $LiBF_4$, and $LiN(SO_2F)_2$, and is most preferably $LiPF_6$.

(Nonaqueous Electrolyte Preparing Process)

The nonaqueous electrolyte used in the power-storage device of the embodiment is obtained by adding the electrolyte salt to the nonaqueous solvent, and optionally adding compounds as a dissolution aid agent to the nonaqueous solvent at the predetermined mixing rate, and mixing them.

The compounds added to the nonaqueous electrolyte may be pre-purified and have as few impurities as possible without decreasing productivity.

(Positive Electrode)

The positive electrode of the lithium ion secondary battery contains a positive electrode current collector and a positive electrode mixture layer formed on the positive electrode current collector. The positive electrode mixture layer includes a positive electrode active material, a conductive agent, and a binder.

As the positive electrode active material, for example, a composite metal oxide with lithium containing one or more selected from the group consisting of cobalt, manganese, and nickel can be used. These positive electrode active materials may be used alone or in a combination of two or more positive electrode active materials.

As the lithium composite metal oxide, for example, one or more $LiNi_{1/2}Mn_{3/2}O_4$, and solid solutions of $LiCoO_2$, $LiCo_{1-x}M_xO_2$ (wherein, M is one or more elements selected from Sn, Mg, Fe, Ti, Al, Zr, Cr, V, Ga, Zn, and Cu), $LiMn_2O_4$, $LiNiO_2$, $LiCo_{1-x}Ni_xO_2$, $LiCo_{1/3}Ni_{1/3}Mn_{1/3}O_2$, $LiNi_{0.5}Mn_{0.3}Co_{0.2}Mn_{0.3}O_2$, $LiNi_{0.8}Mn_{0.1}Co_{0.1}O_2$, $LiNi_{0.8}Co_{0.15}Al_{0.05}O_2$, or $Li_2MnO_3$ with $LiMO_2$ (M is transition metal selected from Co, Ni, Mn, and Fe) can be used.

The conductive agent of the positive electrode is not particularly limited as long as it is an electron conductive material that does not cause a chemical change. For example, one or more carbon black selected from natural graphite (scaly graphite), graphite such as artificial graphite, and acetylene black can be used as the conductive agent.

As the binder, polytetrafluoroethylene (PTFE), polyvinylidene fluoride (PVDF), a copolymer of styrene and butadiene (SBR), a copolymer of acrylonitrile and butadiene (NBR), and carboxymethyl cellulose (CMC) can be used.

As the positive electrode current collector, aluminum foil or stainless steel plates can be used.

The positive electrode can be formed by the following method. The positive electrode active material, the conductive agent, and the binder are mixed and a solvent is added to the obtained mixture and kneaded to obtain a positive electrode mixture. Then, the positive electrode mixture is applied to the positive electrode current collector, and drying, pressure molding, and heating at the predetermined condition are applied to the positive electrode mixture, thereby forming the positive electrode mixture layer.

(Negative Electrode)

The negative electrode of the lithium ion secondary battery contains a negative electrode current collector and a negative electrode mixture layer formed on the negative electrode current collector. The negative electrode mixture layer includes a negative electrode active material, a conductive agent, and a binder.

As the negative electrode active material, one or two or more combinations selected from lithium metal, a lithium alloy, a carbon material capable of absorbing and releasing lithium, tin (single substance), tin compounds, silicon (single substance), silicon compounds, or lithium titanate compounds such as $Li_4Ti_5O_{12}$ can be used.

Among these, in terms of characteristics of absorbing and releasing lithium ions, a highly crystalline carbon material such as the artificial graphite or the natural graphite may be used.

As the negative electrode active material, it is particularly preferable to use the artificial graphite particles having a lumpy structure in which a plurality of flattened graphitic particles are aggregated or combined with each other in a non-parallel manner, or particles in which scaly natural graphite is subjected to a spheroidization treatment by repeatedly applying mechanical actions such as a compressive force, a frictional force, and a shearing force.

The same conductive agent and binder used for the positive electrode can be used as the conductive agent and the binder used for the negative electrode.

Copper foil or the like can be used as the negative electrode current collector.

The negative electrode can be formed by the following method. The negative electrode active material, the conductive agent, and the binder are mixed and a solvent is added to the obtained mixture and kneaded to obtain a negative electrode mixture. Then, the negative electrode mixture is applied to the negative electrode current collector, and drying, pressure molding, and heating at the predetermined condition are applied to the negative electrode mixture, thereby forming the negative electrode mixture layer.

As one of the power-storage device, the structure of the lithium-ion secondary battery is not limited, and for example, coin-shaped batteries, cylindrical batteries, rectangular batteries, or multilayered batteries can be applied (Wound Type Lithium Ion Secondary Battery)

The wound type lithium ion secondary battery as one example of the lithium ion secondary battery has a configuration in which an electrode body is housed in a battery case together with the nonaqueous electrolyte. The electrode body is composed of the positive electrode, the negative electrode, and the separator. At least a part of the nonaqueous electrolyte is impregnated in the electrode body.

The wound type lithium ion secondary battery includes the positive electrode and the negative electrode, the positive electrode includes the positive electrode current collector having a long sheet-shape and the positive electrode mixture layer formed on the positive electrode current collector, and the negative electrode includes the negative electrode current collector having a long sheet-shape and the negative electrode mixture layer formed on the negative electrode current collector.

The separator is formed in the same way as the positive and negative electrodes, in the form of the long sheet-shape. The positive electrode and the negative electrode are wound into a cylindrical shape with the separator interposed between them.

The battery case has a bottomed cylindrical case body and a lid that seals an opening of the case body.

The lid and case body are made of a metal, for example, and are insulated from each other. The lid is electrically connected to the positive electrode current collector, and the case body is electrically connected to the negative electrode current collector. The lid may serve as the positive electrode terminal and the case body may serve as the negative electrode terminal.

The lithium-ion secondary batteries can be charged and discharged at temperatures of −40 to 100° C., preferably −10 to 80° C. As a safety measure to prevent an increase in the internal pressure of the wound type lithium ion secondary battery, a safety valve can be installed in the lid of the battery, or a cut can be made in the case body, the gasket, or other components of the battery. Also, as a safety measure to prevent overcharging, a current cut-off device that senses the internal pressure of the battery and shuts off the current can be provided on the lid.

(Method for Producing Wound Type Lithium Ion Secondary Battery)

One example of the producing method for the wound type lithium ion secondary battery is described below.

First, the positive electrode, the negative electrode, and the separator are each produced. Next, the electrode body is assembled by stacking them and winding them into a cylindrical shape. Then, the electrode body is inserted into the case body, and the nonaqueous electrolyte is injected into the case body. As a result, the electrode body is impregnated with nonaqueous electrolyte. After injecting the nonaqueous electrolyte into the case body, the lid is put on the case body and the lid and the case body are sealed.

The shape of the electrode body after winding is not limited to the cylindrical shape. For example, it may be formed into a flat shape by applying pressure from the side after winding the positive electrode, the separator, and the negative electrode.

The lithium ion secondary battery described above can be used as a secondary battery for various applications. For example, it is installed in a vehicle such as an automobile, and can be suitably used as a power source for the motor and another drive source that drives the vehicle. The type of vehicle is not particularly limited, but hybrid vehicles, plug-in hybrid vehicles, electric vehicles, fuel cell vehicles, and the like are examples. Such a lithium ion secondary battery may be used alone, or a plurality of batteries may be connected in series and/or parallel.

(Multilayered Lithium Ion Secondary Battery)

Although the above describes the wound type lithium ion secondary battery, the present invention is not limited to this and may be applied to a multilayered lithium ion secondary battery.

For example, in the multilayered lithium ion secondary battery, a plurality of positive electrodes and negative electrodes are alternately stacked via the separator and multilayered (sealed).

The multilayered lithium ion secondary battery can be produced by the following method. For example, the positive or negative electrodes are sandwiched and packaged by a pair of the separators. In the embodiment, the positive electrode is made into a bagged electrode. The separators have a size slightly larger than the electrodes. While sandwiching the bodies of the electrodes between the pair of the separators, tabs protruding from electrode ends are made to protrude outward from the separators. The side edges of the stacked pair of separators are joined together to form the bag, and the stacked battery can be made by alternately staking one electrode bagged with the separators with the other electrode and impregnating them with electrolyte. At this time, these separators and electrodes may be compressed in the thickness direction in order to make the thickness thinner.

(Lithium Ion Capacitor)

The lithium ion capacitor is another power-storage device in the embodiment.

The lithium ion capacitor of the embodiment has the positive electrode, the negative electrode, the separator, and the nonaqueous electrolyte. The polyolefin micro-porous film or the separator film for the power-storage device of the embodiment is used as the separator.

The lithium ion capacitor can store energy by using the intercalation of lithium ions into carbon materials such as graphite, which is the negative electrode. The positive electrode can be, for example, an electric double layer between an activated carbon electrode and an electrolyte, or a π-conjugated polymer electrode using a doping/de-doping reaction. The nonaqueous electrolyte contains at least a lithium salt such as $LiPF_6$.

EXAMPLES

The present invention is described below in further detail using examples, but the present invention is in no way limited by the following examples.

(Evaluation Method)

A polyolefin micro-porous film was produced by the following method, and the raw materials and the raw film were evaluated in the following items by the following methods.

(Measurement of Thicknesses of Raw Film and Polyolefin Micro-Porous Film (Multilayered Structure))

From the sample, five tape-shaped test samples having a total width of 50 mm in the length direction (in the MD) were prepared. The five test sample were stacked and measured at equal intervals in the width direction so that there were 25 measurement points. The thickness of the stacked test sample was measured using an electric micrometer (Millitron 1240 manufactured by Feinpruf GmbH, 5 mmφ of the needle (on the flat surface, needle pressure of 0.75 N)). At the measurement points, ⅕ of each of the measured values was used as the thickness of one test sample, and the average value thereof was calculated as thickness of the test sample.

(Coefficient of Variation (C.V.) to Thickness)

The coefficient of variation (C.V.) of the thickness of the raw film was obtained by measuring the thickness of the test sample at equal intervals in the width direction (in the TD) so that there were 25 measurement points, in the same method as the thickness measurement above, and dividing the standard deviation of the results by the arithmetic average.

$$\left(\sqrt{\sigma^2}\right)$$ [Expression 1]

(Arithmetic Average)

$$(\bar{x})$$ [Expression 2]

The coefficient of variation (C.V.) of the thickness of the raw film was evaluated as an index of the variation of the thickness in the width direction of the raw film.

(Birefringence)

The birefringence was measured using a polarizing microscope with a berek compensator under a crossed nicols.

(Elastic Recovery Rate)

The elastic recovery rate of the PE raw film can be calculated from Expression (1). The length when the load becomes zero after elongating by 50% was measured by placing a test sample (having a width of 15 mm and the length of 2 inches) in a tensile tester at 25° C. and relative humidity of 65%, elongating the test sample to 50% at a rate of 2 inches/min, holding the test sample in the elongated state for 1 minute, and then relaxing the test sample at the same rate.

Elastic recovery rate (%)=[(Length at 50% elongation−Length at 0% load after 50% elongation)/(Length at 50% elongation−Length before elongation)]×100 (1)

The elastic recovery rate of the PP raw film can be calculated from Expression (2). The length at zero load after 100% elongation was measured by placing a test sample (having a width of 10 mm and the length of 50 mm) in a tensile tester at 25° C. and relative humidity of 65%, elongating the test sample to 100% at a speed of 50 mm/min, immediately relaxing the test sample at the same speed, and then heat-treating the test sample at 150° C. for 30 minutes.

Elastic recovery rate (%)=[(Length at 100% elongation−Length when load becomes 0 after 100% elongation)/Length before elongation]×100 (2)

(Measurement of Melting Points of PE Resin and PP Resin)

Using an input-compensating DSC (trade name: Diamond DSC manufactured by Perkin-Elmer), the temperature was increased from 30° C. to 250° C. in the scanning temperature range at a temperature increase rate of 10° C./min according to ISO 3146, and heat treatment was performed for 10 minutes after the temperature increase scanning. The temperature was then lowered to the lower limit of the scanning temperature range at a rate of 10° C./min, and the temperature was scanned again at a rate of 10° C./min up to the upper limit of the scanning temperature range, and the peak top temperature of the endothermic peak at that time was used as the melting point.

(Weight-Average Molecular Weight and Molecular Weight Distribution)

The weight-average molecular weight and the molecular weight distribution of the PE resin used as the raw material for the PE raw film and the PP resin used as the raw material for the PP raw film were determined by using the PL-GPC220 gel permeation chromatograph (manufactured by Agilent Technologies) and conversion using a standard polystyrene. As the column, two columns (PLgel Olexis) were used. The measurement was carried out at 145° C. in ortho-dichlorobenzene prepared to 0.05 wt/vol %. A refractive index detector (RI) was used as the detector.

(Porosity of Polyolefin Micro-Porous Film (Multilayered Structure))

Two test pieces of 100 mm×100 mm were taken along both sides of a test sample in the width direction using a formwork. The weight of each of the two test pieces was measured to 0.1 mg. The porosity was calculated from the measured weight using the following expression.

$$\text{Porosity (\%)} = [1 - \{w/(L1 \times L2 \times t) \times \rho\}] \times 100$$

w: Weight of the test piece (g)
L1: Length of the test piece in the longitudinal direction (cm)
L2: Length of the test piece in the traverse direction (cm)
t: Thickness of the test piece (cm)
ρ: Density of the test piece (g/cm3)

(Surface Opening Ratio of Polyolefin Micro-Porous Film (Multilayered Structure))

The surface of the polyolefin micro-porous film was observed by the SEM, and the obtained image was binarized by ImageJ. In the binarized image, the opening portion were detected as black, and the unopened portion were detected as white, and the opening portion and the unopened portion were separated. Each four areas having 10 µm×10 µm in the binarized image was analyzed and the total area of the opening portion was calculated in the each areas. The average value of the opening portion per one area was obtained from the total area of each opening portion, and the average value of the opening portion was divided by the area of the image analysis, and the obtained value is evaluated as a percentage.

(Measurement of Permeability (the Gurley Value) of Polyolefin Micro-Porous Film (Multilayered Structure))

From the polyolefin micro-porous film, test samples having a total width of 80 mm in the MD were prepared at three points of a central part and at both ends (each end was a portion 50 mm inward from the end of the polyolefin micro-porous film). Each test sample was measured by the B-type Gurley Type Densometer (manufactured by TOYO SEIKI CO., LTD) in accordance with JIS P8117, and the average value of the three points was evaluated as the Gurley value.

(Shutdown Temperature and Meltdown Temperature)

The shutdown temperature and meltdown temperature were measured using a self-made cell for the electrical resistance measurement. A solvent mixture was prepared by mixing propylene carbonate (PC) and diethyl carbonate (DEC) in a volume ratio of PC/DEC=3/7. The polyolefin micro-porous film (the multilayered structure) was impregnated with the electrolyte in which lithium hexafluorophosphate was dissolved to a concentration of 1 mol/L in the solvent mixture, and used as a separator sample piece. The separator sample piece impregnated with the electrolyte was sandwiched between nickel electrodes, and the temperature was raised at a rate of 10° C./min. The interelectrode resistance was measured using a resistance measurement device (LCR Hi-Tester (manufactured by Hioki Electric Co., Ltd.)) at a measurement frequency of 1 kHz. The temperature at which the electrical resistance reached 1,000Ω was set as the shutdown temperature.

After the shutdown temperature, the temperature was continuously raised to 230° C. to confirm that a short circuit occurred, and the temperature at which the short circuit occurred was set as the meltdown temperature.

The shutdown characteristics shown in Table 1 were evaluated as "A" when the shutdown functioned at temperatures of 140° C. or higher, and "B" when the shutdown did not function at temperatures below 140° C.

The resistance to the breakage of the polyolefin micro-porous film under heating shown in Table 1 was evaluated as "A" when the meltdown temperature was 180° C. or higher, and "B" when the meltdown temperature was less than 180° C.

As shown below, when the polyolefin micro-porous film had the high melt down temperature, high safety of the polyolefin micro-porous film used as the separator in the power-storage device was evaluated. In other words, in the power-storage device, the mobility of ions between the positive electrode and the negative electrode was shut off, the electrical resistance was thereby increased, and functions of the power-storage device were stopped (shut down), and further, even if the temperature in the power-storage device increased, the separator had excellent breakage resistance properties and an excellent function of preventing a short circuit (the reaction) caused by contacting electrodes.

(Heat Shrinking Rate)

Test samples (200×200 mm) were taken from the polyolefin micro-porous film (multilayered structure) so that the position 10 mm inward from the end in the width direction (in the TD) was along one side of the test samples. Markers with a distance of 180 mm between the markers were placed in the center of each test samples in the width direction (in the TD) and in the length direction (in the MD), and the dimension between the markers was measured with a steel scale. The test samples with the distance between the markers was sandwiched between papers and heat-treated at 105° C. for 2 hours by a hot air circulation system DK-43 (manufactured by Yamato Kagaku).

The heat-treated test samples were taken off while the test samples were sandwiched with the paper, and cooled at room temperature for 60 minutes, and the distance between the points was measured with a steel scale.

The heat shrinking rate was calculated using the following expression, where the distance between the mark points before heating was L1 (mm) and the distance between the mark points after heating was L2 (mm).

$$\text{Heat shrinking rate}=(L1-L2)/L1\times 100$$

(Withstand Voltage Per Unit Area Test)

The withstand voltage tests at 3 kV/m² and 5 kV/m² were performed in test samples of 10 cm×100 cm by using the pinhole tester TO-5DP (manufactured by Sanko Electronics Laboratory, Inc.,) under 0.3 kV and 0.5 kV and scanning the probe contacted with the surface of the test samples.

The evaluation results were determined as A or B.

A: No current-carrying point.

B: There were one or more current-carrying points.

(Zero Shear Viscosity)

Shear dynamic viscoelasticity measurements of the PE resin and the PP resin were performed using a rheometer ARES (model: ARES, manufactured by TA Instruments). A cone-parallel plate (having a cone angle of 0.1 rad) was used for the geometry. Dynamic viscoelasticity measurements were performed at four different temperatures (220° C., 200° C., 180° C., and 160° C.) under the frequency range of 400 to 0.01 s⁻¹ (5 points per decade) and the strain of 0.1 (10%), and the master curve was created based on the measurement data at 180° C. The values of the viscosity that became a constant value in the frequency of 0.01 s⁻¹ or lower was defined as the zero shear viscosity. In this description, the master curve was created based on the measurement data at 180° C. described above, and the zero shear viscosity is calculated based on this master curve, which is referred to as the "180° C. condition."

Example 1

One example of the producing method for the polyolefin micro-porous film of Example 1 is shown below. The producing method for the polyolefin micro-porous film of Example 1 is not limited to the producing method described below, and other methods may be used. For example, as another method, the polyolefin micro-porous film of Example 1 may be produced by performing a co-extrusion process using the T-die and a stretching process.

(Film Formation of PP Raw Film)

Using a T-die with a discharge width of 1,000 mm and a discharge lip opening of 2 mm, the polypropylene resin with the weight-average molecular weight of 800,000, the molecular weight distribution of 16.0, the pentad fraction of 92%, and the melting point of 161° C. was melt extruded at a T-die temperature of 200° C. The discharged film was led to the cooling roll at 90° C., cooled by blowing cold air at 37.2° C., and then taken off at the take-up speed of 40 m/min. The obtained unstretched polypropylene film (the PP raw film) had a film thickness of 5.4 μm, a birefringence of 15.0×10$^{-3}$, and an elastic recovery of 90.0% after heat treatment at 150° C. for 30 minutes. The coefficient of variation (C.V.) of the obtained PP raw film with respect to the thickness of the raw film was 0.015.

(Film Formation of PE Raw Film)

Using the T-die with the discharge width of 1,000 mm and the discharge lip opening of 2 mm, the high density polyethylene with the weight-average molecular weight of 460,000, the molecular weight distribution of 12.4, the density of 0.964 g/cm$^3$, and the melting point of 133° C. was melt extruded at the T-die temperature of 173° C. The discharged film was led to the cooling roll at 115° C., cooled by blowing cold air at 39° C., and then taken off at the take-up speed of 20 m/min. The coefficient of variation (C.V.) for the thickness of the obtained unstretched polyethylene film (the PE raw film) was 0.016.

(Lamination Process)

Using the unstretched PP raw film (the PP raw film) and the unstretched PE raw film (the PP raw film), a three-layer multilayered film with a sandwich configuration in which both outer layers were formed of the PP resin and the inner layer was formed of the PE resin was produced as follows.

From the three sets of the raw film roll stands, the PP raw film and the PE raw film were each wound off at a speed of 6.5 m/min; the PP raw films were arranged on the both surfaces of the PE raw film, and these raw films were passed between heated rolls to be thermo-compressed at 147° C. After that, the film was led to a cooling roll at 30° C. at the same speed, and then unwound to obtain a three-layer multilayered film. The unwinding tensions were 5.0 kg for the PP raw film and 3.0 kg for the PE raw film.

(Stretching Process)

The three-layered multilayered film was led into the heating air convection oven (heat treatment zone: oven 1) heated to 125° C. for heat treatment. The heat-treated multilayered film was then cold stretched at 18% (1.18 times the initial stretching ratio before the stretching process) (initial stretching ratio) between nip rolls maintained at 35° C. in the cold stretching zone. The roll speed on the supply side was 2.8 m/min. Next, the low-temperature stretched multilayered film was stretched at a high temperature in a hot stretching zone (oven 2) heated to 130° C. until it reached 190% (2.90 times that before the stretching process) (the maximum stretching ratio) between rollers using the difference in roll peripheral speed. The hot-stretched multilayered film was then thermally relaxed at 130° C. to 125% (2.25 times that before the stretching process) (the final stretching ratio). Then, the heat-treated film that had passed through the hot stretching zone was heat-treated at 133° C. in the heat fixation zone (oven 3) for heat fixing.

Through the above process, the polyolefin micro-porous film consisting of a three-layer structure of PP/PE/PP was continuously obtained.

The weight-average molecular weight, the molecular weight distributions, the thicknesses of the PP raw film (thicknesses of the unstretched first and third layers) and the thicknesses of the PE raw film (thicknesses of the unstretched second layer) used to make the polyolefin micro-porous films of Example 1 are shown in Table 1.

Furthermore, the thickness of the polyolefin micro-porous film (the multilayered structure) of Example 1, the porosity, the surface opening ratio, the Gurley value, the thickness ratio of the first layer, the second layer, and the third layer, the temperature of the shutdown, the heat shrinking rate at 105° C., the results of the withstand voltage per unit area test, and the meltdown temperature are shown in Table 1.

Example 2 to Example 4

The polyolefin micro-porous film was produced in the same manner as in Example 1, except that the film thicknesses of the PP raw film and the PE raw film were changed by adjusting the amount of resin discharged during melt extrusion, and the thickness ratio of the first, second, and third layers was changed as shown in Table 1.

Example 5

The multilayered raw film with a three-layer structure (PP/PE/PP) was produced using the multilayer raw film forming apparatus in the same manner as in Example 1, except that the laminating process was omitted. The thicknesses of the first layer composed of the PP resin, the second layer composed of the PE resin, and the third layer composed of the PP resin in the multilayered raw film were determined by using a scanning electron microscope (SEM) to analyze images taken from the cross-section of the multilayered raw film.

Example 6

The polyolefin micro-porous film was produced in the same manner as in Example 1, except that the raw material of the PP resin was changed and the thicknesses of the PP raw film and the PE raw film were changed by further adjusting the discharge rate of the resin during melt extrusion to the ratio of the thicknesses of the first, second and third layers shown in Table 1.

The raw material of the PP resin with the weight-average molecular weight of 790,000 to 830,000, the molecular weight distribution of 12 to 16, the pentad fraction of 94.3%, and the melting point of 159° C. was used as the raw material for the PP resin.

Example 7

The polyolefin micro-porous film was produced in the same manner as in Example 1, except that the raw material of the PP resin was changed and the thicknesses of the PP raw film and the PE raw film were changed by further adjusting the discharge rate of the resin during melt extrusion to the ratio of the thicknesses of the first, second, and third layers shown in Table 1.

The raw material of the PP resin with the weight-average molecular weight of 1,080,000 to 1,120,000, the molecular weight distribution of 6 to 10, the pentad fraction of 96.7%, and the melting point of 160° C. was used as the raw material for the PP resin.

Example 8

The polyolefin micro-porous film was produced in the same manner as in Example 1, except that the raw material of the PP resin was changed and the thicknesses of the PP raw film and the PE raw film were changed by further adjusting the discharge rate of the resin during melt extrusion to the ratio of the thicknesses of the first, second, and third layers shown in Table 1.

The raw material of the PP resin with the weight-average molecular weight of 500,000 to 560,000 and the molecular weight distribution of 4.5 to 8.5 was used as the raw material for the PP resin.

Comparative Example 1

The polyolefin micro-porous film was produced in the same manner as in Example 1, except that the raw material of the PP resin and the raw material of the PE resin were changed and the thicknesses of the PP raw film and the PE raw film were changed by further adjusting the discharge rate of the resin during melt extrusion to the ratio of the thicknesses of the first, second, and third layers shown in Table 1.

The raw material of the PP resin with the weight-average molecular weight of 600,000 to 650,000, the molecular weight distribution of 6 to 10, and the melting point of 166 to 167° C. was used as the raw material for the PP resin; the raw material of the PE resin with the weight-average molecular weight of 380,000, the molecular weight distribution of 9.3, the density of 0.964 g/cm$^3$, and the melting point of 134° C. was used as the raw material for the PE resin.

The weight-average molecular weights and the molecular weight distributions of the PP and PE resins used to produce the polyolefin micro-porous films, the thicknesses of the PP raw film (thicknesses of the un stretched first and third layers), and the thicknesses of the PE raw film (thicknesses of the unstretched second layer) in Examples 1 to 8 and Comparative Example 1 are shown in Table 1.

The thickness, the porosity, the surface opening ratio, the Gurley value, the ratio of the thickness of the first, second and third layers, the shutdown characteristic, the resistance to the breakage at heating, the heat shrinking rate at 105° C., the results of the withstand voltage par unit area test, and the meltdown temperature of the polyolefin micro-porous film (the multilayered structure) in the Examples 1 to 8 and Comparative Example 1 are shown in Table 1.

TABLE 1

| | | | Example 1 | Example 2 | Example 3 | Example 4 | Example 5 |
|---|---|---|---|---|---|---|---|
| Raw Material | PP resin | Weight-average molecular weight | 780,000 to 820,000 | 780,000 to 820,000 | 780,000 to 820,000 | 780,000 to 820,000 | 780,000 to 820,000 |
| | | Molecular weight distribution | 13 to 17 | 13 to 17 | 13 to 17 | 13 to 17 | 13 to 17 |
| | PE resin | Weight-average molecular weight | 460,000 | 460,000 | 460,000 | 460,000 | 460,000 |
| | | Molecular weight distribution | 11 to 14 | 11 to 14 | 11 to 14 | 11 to 14 | 11 to 14 |
| | Zero shear viscosity at 180° C. (PP resin) (Pa·s) | | 23,500 | 23,500 | 23,500 | 23,500 | 23,500 |
| | Zero shear viscosity at 180° C. (PE resin) (Pa·s) | | 43,000 | 43,000 | 43,000 | 43,000 | 43,000 |
| | ηPP + 25,000 (Pa·s) | | 48,500 | 48,500 | 48,500 | 48,500 | 48,500 |
| Raw film | Thickness of PP raw film (unstretched first layer) (μm) | | 5.4 | 4.0 | 4.0 | 4.0 | 2.5 |
| | Thickness of PE raw film (unstretehed second layer) (μm) | | 9.4 | 7.6 | 6.5 | 5.0 | 8.0 |
| | Thickness of PP raw film (unstretched third layer) (μm) | | 5.4 | 4.0 | 4.0 | 4.0 | 2.5 |
| Polyolefin micro-porous membrane | Thickness (μm) | | 16 | 12 | 11 | 10 | 10 |
| | Porosity (%) | | 55 | 60 | 60 | 60 | 60 |
| | Surface opening ratio (%) | | 12 to 25 | 12 to 25 | 12 to 25 | 12 to 25 | 12 to 25 |
| | Gurley value (sec/100 cc) | | 150 to 250 | 100 to 200 | 100 to 200 | 100 to 200 | 100 to 200 |
| | Thickness ratio (First layer/Second Layer/Third layer) | | 1/1.8/1 | 1/1.9/1 | 1/1.6/1 | 1/1.3/1 | 1/3.2/1 |
| | Shutdown characteristic (140° C.) | | A | A | A | A | A |
| | Resistance to breakage (180° C.) | | A | A | A | A | A |
| | Heat shrinking rate at 105° C. (%) | | 4.5 | 5.0 | 5.1 | 5.0 | 5.5 |
| | Withstand voltage par unit area (3 kV/m$^2$) | | A | A | A | A | A |
| | Withstand voltage par unit area (5 kV/m$^2$) | | A | A | A | A | A |
| | meltdown temperature (° C.) | | 210 | 210 | 210 | 205 | 190 |

| | | | Example 6 | Example 7 | Example 8 | Comparative Example 1 |
|---|---|---|---|---|---|---|
| Raw Material | PP resin | Weight-average molecular weight | 790,000 to 830,000 | 1,080,000 to 1,120,000 | 500,000 to 560,000 | 600,000 to 650,000 |
| | | Molecular weight distribution | 12 to 16 | 6 to 10 | 4.5 to 8.5 | 6 to 10 |
| | PE resin | Weight-average molecular weight | 460,000 | 460,000 | 460,000 | 480,000 |
| | | Molecular weight distribution | 11 to 14 | 11 to 14 | 11 to 14 | 12 to 15 |
| | Zero shear viscosity at 180° C. (PP resin) (Pa·s) | | 23,300 | 126,000 | 10,500 | 22,900 |
| | Zero shear viscosity at 180° C. (PE resin) (Pa·s) | | 43,000 | 43,000 | 43,000 | 43,000 |
| | ηPP + 25,000 (Pa·s) | | 48,300 | 151,000 | 35,500 | 47,900 |

TABLE 1-continued

| | | | | | |
|---|---|---|---|---|---|
| Raw film | Thickness of PP raw film (unstretched first layer) (μm) | 1.5 | 1.5 | 2.5 | 9.0 |
| | Thickness of PE raw film (unstretched second layer) (μm) | 6.0 | 13.4 | 10.6 | 7.6 |
| | Thickness of PP raw film (unstretched third layer) (μm) | 1.5 | 1.5 | 2.5 | 9.0 |
| Polyolefin micro-porous membrane | Thickness (μm) | 8 | 12 | 12 | 20 |
| | Porosity (%) | 60 | 55 | 60 | 60 |
| | Surface opening ratio (%) | 12 to 25 | 12 to 25 | 10 to 30 | 28 |
| | Gurley value (sec/100 cc) | 100 to 200 | 100 to 200 | 100 to 200 | 300 to 400 |
| | Thickness ratio (First layer/Second Layer/Third layer) | 1/4.0/1 | 1/8.6/1 | 1/4.2/1 | 1/0.8/1 |
| | Shutdown characteristic (140° C.) | A | A | A | B |
| | Resistance to breakage (180° C.) | A | A | B | B |
| | Heat shrinking rate at 105° C. (%) | 5.8 | 4.2 | 6.4 | 5.0 |
| | Withstand voltage par unit area (3 kV/m$^2$) | A | A | A | A |
| | Withstand voltage par unit area (5 kV/m$^2$) | A | A | A | A |
| | meltdown temperature (° C.) | 185 | 205 | 170 | — |

The zero-shear viscosities of the PP resins used as raw materials in Examples 1 to 8 and Comparative Example 1 and the zero-shear viscosities at 180° C. of the PE resins used as raw materials in Examples 1 to 8 and Comparative Example 1 were measured using the method described above. The results are shown in Table 1.

As shown in Table 1, the zero shear viscosity of the PP resin used in Examples 1 to 5 was 23,500 Pa·s. The zero shear viscosity of the PP resin used in Example 6 was 23,300 Pa·s, the zero shear viscosity of the PP resin used in Example 7 was 126,000 Pa·s, and the zero shear viscosity of the PP resin used in Example 8 was 10,500 Pa·s. The zero shear viscosity of the PP resin used in Comparative Example 1 was 22,900 Pa·s.

As shown in Table 1, the PE resin used as a raw material in Examples 1 to 8 and Comparative Example 1 was 43,000 Pa·s.

The value of ηPP+25,000 (Pa·s) was calculated from the zero shear viscosity ηPP (Pa·s) of the PP resin at 180° C. The results are shown in Table 1.

As shown in Table 1, in Examples 1 to 7 and Comparative Example 1, the zero shear viscosity ηPE (Pa·s) of the PE resin at 180° C. was less than TIPP (the zero shear viscosity of the PP resin at 180° C.)+25,000 (Pa·s).

In contrast, in Example 8, the zero shear viscosity ηPE (Pa·s) of the PE resin at 180° C. was more than ηPP (the zero shear viscosity of the PP resin at 180° C.)+25,000 (Pa·s).

As shown in Table 1, Examples 1 to 8 had an "A" rating for shutdown characteristics.

In contrast, Comparative Example 1 had a "B" rating for the shutdown characteristics and a "B" rating for the resistance to breakage of the polyolefin micro-porous film during heating, making it less safe than Examples 1 to 8. This is because, in Comparative Example 1, unlike Examples 1 to 8, in the polyolefin micro-porous film, the thickness of the first layer and the thickness of the third layer made of the PP resin are thicker than the thickness of the second layer made of the PE resin. Therefore, it is presumed that the pores of the PP resin could not be sufficiently closed by the melted PE resin in Comparative Example 1.

Furthermore, Examples 1 to 7 were rated "A" not only for the shutdown characteristic but also for the resistance to breakage of the polyolefin micro-porous film during heating, with a melt-down temperature of 180° C. or higher. This is presumably because the zero shear viscosity at 180° C. of the PP resin is high in Examples 1 to 7, and the zero shear viscosity ηPE (Pa·s) at 180° C. of the PE resin to form the second layer is less than ηPP+25,000 (Pa·s). More precisely, it is presumed that this is due to the fact that the first and third layers made of the PP resin are not able to withstand and deform under the influence of shrinkage and melting of the second layer made of the PE resin during shutdown, thereby suppressing the phenomenon of film breakage in a short time.

What is claimed is:

1. A polyolefin micro-porous film comprising a multilayered structure, wherein the multilayered structure includes:
   a first layer composed of polypropylene resin;
   a second layer composed of polyethylene resin and provided on the first layer; and
   a third layer composed of polypropylene resin and provided on the second layer,
   wherein a thickness of the first layer is thinner than a thickness of the second layer,
   wherein a thickness of the third layer is thinner than the thickness of the second layer,
   wherein in the multilayered structure, a thickness is 16 μm or less, a porosity is 40 to 70%, and an surface opening ratio is 10 to 30%,
   wherein a zero shear viscosity ηPE(Pa·s) of the polyethylene resin at 180° C. satisfies following Expression (I), $$\eta PE \leq \eta PP + 25{,}000 \qquad (I)$$

and
   wherein, in the Expression (I), ηPP indicates a zero shear viscosity (Pa·s) of the polypropylene resin at 180° C.

2. The polyolefin micro-porous film according to claim 1, wherein, a thickness ratio of the first layer thickness to the thickness of the third layer is 1, the ratio of the thickness of the second layer to the thickness of the first and third layer is 2 or more.

3. The polyolefin micro-porous film according to claim 1, wherein, in a short circuit test in which a voltage is applied to a test plate having a size of 10 cm×100 cm, a withstand voltage per unit area obtained by measuring a voltage in a non-conducting state is 3 kV/m$^2$ or more.

4. A power-storage device comprising the polyolefin micro porous film according to claim 1, wherein the polyolefin micro-porous film is provided between electrodes.

5. The polyolefin micro-porous film according to claim 2, wherein, in a short circuit test in which a voltage is applied to a test plate having a size of 10 cm×100 cm, a withstand voltage per unit area obtained by measuring a voltage in a non-conducting state is 3 kV/m² or more.

6. A power-storage device comprising the polyolefin micro-porous film according to claim 2, provided between electrodes.

7. A power-storage device comprising the polyolefin micro-porous film according to claim 3, provided between electrodes.

* * * * *